Figure 1:
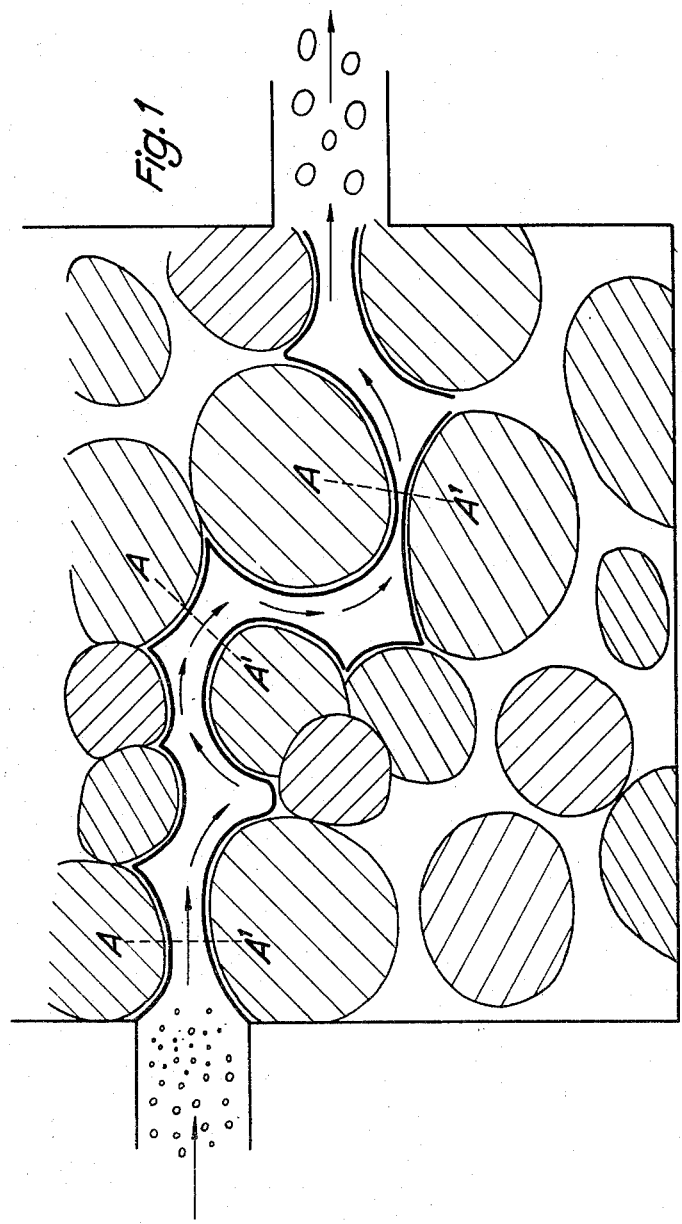

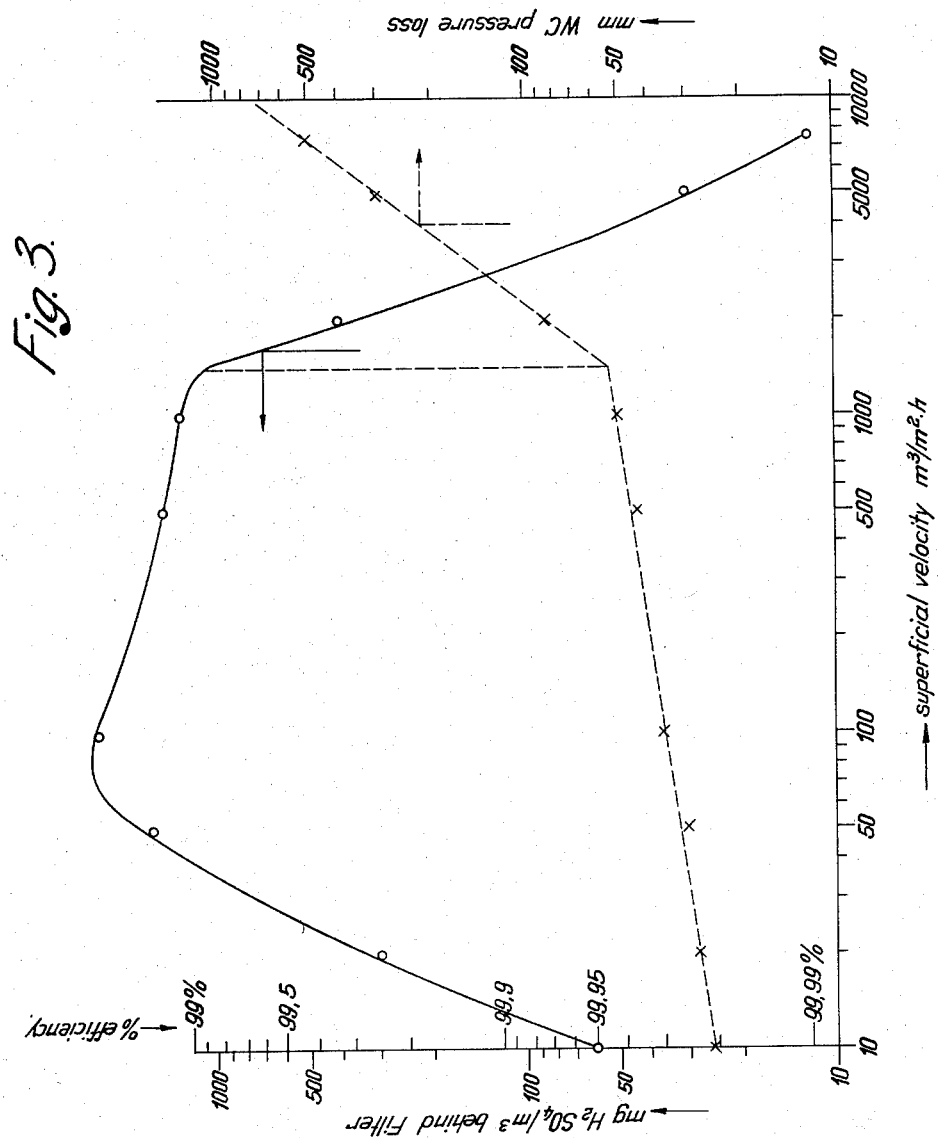

2,947,383
PROCESS FOR COLLECTING THE LIQUID CONTAINED IN A MIST

Franz Schytil and Hubert Krollmann, Frankfurt am Main, Germany, assignors to Metallgesellschaft, A.G., Frankfurt am Main, Germany Filed June 7, 1956, Ser. No. 590,069

Claims priority, application Germany Sept. 13, 1950

3 Claims. (Cl. 183—121)

The present invention relates to an improved process for the collection of the liquid contained in a mist and more particularly for such collection from mists in which the particle size of substantial quantities of the mist droplets is extremely small, for example, below $50\mu$ in diameter.

Various processes are known for the collection of liquids contained in mists. The process with the highest efficiency previously known is the electrostatic precipitation. This process give efficiencies up to 99% but requires very high investment costs and is applicable only to a limited degree to the precipitation of highly corrosive components. For example, disturbances occur in electrostatic precipitation when mists of sulfuric acid are precipitated whose droplets consist of an acid with higher strength than about 80%.

Mechanical means have been known for some time for the collection of mists, such as, filters consisting of porous material, for example, ceramics, fabrics, felts or packings of granular material (coke, glass globules, etc.). Up to the present, in the operation of such filters the following two principles have been applied:

(1) Pure sieving action, that is ordinary droplets larger than the pore size of the filter are accumulated on the side of the filter facing the gas stream passed therethrough. The thickness of the filter is of no importance in this case, but it is important to use low gas velocities as otherwise the collected liquid would be pressed into and thereby clog the pores. In filters operated according to this procedure, it has been proposed to employ filter materials whose surfaces are not wetted by the liquid being collected.

(2) In the use of filters having a larger pore diameter than the mist droplets to be collected, it has been proposed to pass the gas through the filter so slowly that sufficient time is permitted for the transverse Brownian movement to bring the particles to the surface of the wetted pores where they are collected by the liquid film covering the pore surface.

Filters operating according to these principles show a decrease in efficiency with increase in velocity so that the investment costs and the cost of operation increase disproprotionately with increase in desired efficiencies, especially when mists are treated which contain particles of small size, for example, below $50\mu$ in diameter. Actually mists with much smaller droplets occur, such as from 0.1 to $5\mu$ in diameter, so that these mists cannot be precipitated according to the above-mentioned principles in a commercially feasible way with a higher efficiency than about 70–80%. For example, commercially operated coke filters operate usually with an efficiency of 60–65%, even with coarse mists, although theoretically any desired degree of efficiency can be obtained by decreasing the particle size of the coke and the gas velocity. But any increases in efficiency obtained in this way is paid for with such an increase in cost of investment and operation, that the cost of the electrostatic precipitation is quickly arrived or even surpassed. Therefore even with other methods, such as laboratory procedures, where commercial considerations play only a minor role, only efficiencies of about 94–95% have been achieved.

(3) Inertia phenomena is used in another method of collecting mists. If a stream of mist containing gas is deflected from a straight path, the heavy mist particles are thrown out by centrifugal force onto a surface much more rapidly than lighter particles and are collected on such surface. However, this gives satisfactory results only if the inertia of the individual mist particles is much greater than the force of the gas resistance, i.e., only relatively large droplets, such as above $50\mu$ in diameter, have sufficient inertia. Actually, the efficiency with mist droplets in the neighborhood of $50\mu$ is relatively poor and it is only with droplets of about $200\mu$ and above that really satisfactory results are obtained. Cyclones, perforated plates and baffle plates operate according to this principle.

As the above-mentioned types of procedures give satisfactory results only with coarse mists, proposals have been made to carry out the operations which give rise to mist formation in such a way that either the mist formation is suppressed as much as possible or the formation of large mist droplets is favored. However, these expedients are in many cases not convenient and it has therefore also been proposed to subject fine mists to sonic or ultrasonic waves to effect coalescence of the fine mist droplets to coarser droplets. However, the high energy consumption and the almost unbearable noise connected with this measure prohibited the commercial use of this proposal.

The object of the present invention is to provide a process which renders it possible to collect liquid from mists, regardless of the particle size, composition of the liquid in the particles and of the content of liquid per unit volume of gas, with an efficiency which is at least equal to that of an electro filter and even above.

The process according to the invention requires substantially less investment cost than an electro filter (approximately one-tenth of the investment cost of an electro filter). Even in operation with highly corrosive components, no disturbances have been observed after a run of several years.

According to the invention, it was unexpectedly found that although the efficiency of known processes employing porous filters decreases with increasing gas velocity as long as conventional gas velocities are used, the efficiency increases with much higher gas velocities, especially above a critical point which is substantially higher than the range of gas velocities previously used in processes employing porous filters.

Whereas the highest gas valocity used up to now in porous filters is about 0.3 m./sec. calculated with reference to the free cross-sectional area of the pores, the gas velocities employed according to the invention are in the range of 1.0 to 20 m./sec. with reference to the free pore area of the filter or approximately 0.3 to 4 m./sec. with reference to the total cross-sectional area of the filter. Preferably, velocities of 0.5 to 2 m./sec. with reference to the total cross-sectional area are employed according to the invention. The critical value of the gas velocity which has to be surpassed according to the invention is characterized by the fact that from this point on the pressure-drop-velocity diagram, plotted in logarithmic scale, shows a distinct break with an increase in inclination. It was found that only in the range above this critical velocity that the new effect according to the invention takes place.

The critical velocity above which the process according to the invention operates is therefore determined by a break point in the pressure drop velocity diagram. As the portions of the curve above and below this critical point are also in the shape of a curve, it is favorable to plot the curves on a full logarithmic scale. This measure straightens out both parts of the curve to substantially straight lines with different inclinations, whereby the break point, which is the critical factor of the instant invention, becomes more easily discernible. The actual curves obtained depend primarily on the fact, whether a pure gas or a mist containing gas is used for the tests, but in both cases the critical break point occurs at roughly the same gas velocity.

Furthermore, it has been found that the break point occurs with filters of all materials, pore sizes and dimensions which come into practical consideration at gas velocities which correspond to a pressure drop of 200 mm. water column or less. Therefore, one can be practically certain to operate above the critical point, that is within the velocity range according to the instant invention when using gas velocities which cause pressure drops of 200 mm. water column or more. As filters of practical application, it is not contemplated to include filters of such magnitude, both in area and depth, as to make their use commercially impossible.

For example, pressure drops of 200 mm. or more, which would still be below the critical point, might conceivably be obtained in very high coke filters, for example of a depth of one hundred feet or more, operated at conventionally low gas velocities, which are below the break point in the pressure drop velocity diagram. Also, conceivably a pressure drop above 200 mm. water column could be obtained with gas velocities below the critical break point when filters of extremely fine pore size, for example, 10µ or less, are employed, in which the pressure drop is generated by the surface of the liquid clogging the pores and not by the gas velocity. In this case, to obtain the same throughputs as the instant invention, the filter area would have to be 1000 to 10,000 times greater than the practically sized filter employed according to the invention.

Figure 2:
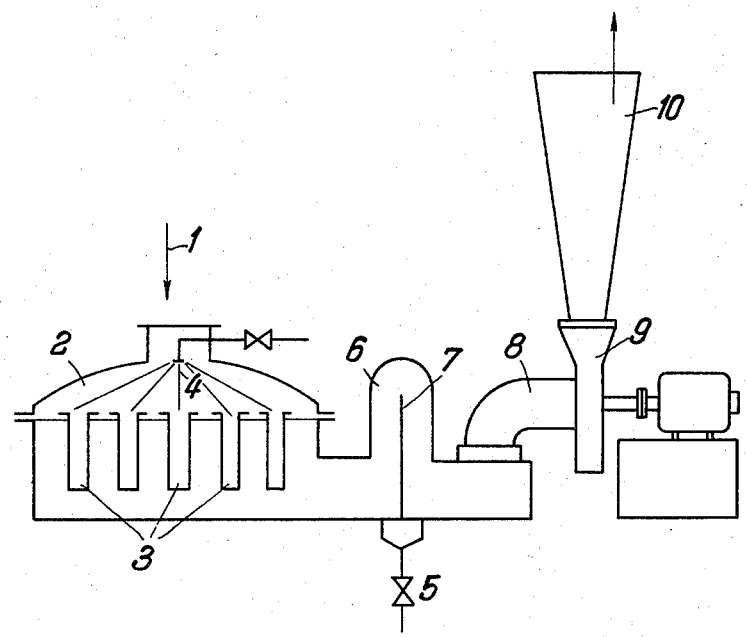

In the accompanying drawings:

Fig. 1 diagrammatically shows a porous filter while being operated according to the process of the invention;

Fig. 2 diagrammatically shows an apparatus for carrying out the process according to the invention; and Fig. 3 shows a graph in which the broken line is a logarithmically plotted pressure-drop-velocity curve, and the full line shows the effect of the gas velocities employed upon the efficiency of mist collection.

As diagrammatically shown in Fig. 1, the capillaries of every porous filter consist of consecutive restrictions A—A' and enlargements B—B', as every porous layer is built up of elements 20 with a roughly circular-cross-section (this holds true as well with packings as with sintered, fritted, woven and felt-like materials). The surface of the pores are either prewetted or are wetted after a starting up period with the liquid of the collected mist droplets. With slow gas velocities, as long as the gas velocities are in the usual range of not more than at most 1 m./sec. with reference to the actual free area of the pores, the pressure drop increased with increasing gas velocity, but only slightly because the aerodynamic affect of the increased friction caused by the increased gas velocity will be compensated for the greater part by the enlargement of the available free cross-area of the pores which is caused by the fact that increased gas velocities tend to flatten out the film of liquid wetting the pore surfaces. At a certain critical gas velocity, which is higher than the gas velocities heretofore employed, which depends on the size and shape of the pores, the mist content of the gas and the droplet size, a new effect takes place, namely, the films which adhere to the pores at lower velocities are torn off at the narrowest cross-sections of the pores A—A' and atomized. The torn off liquid particles, which possess very different diameters and correspondingly different inertias, will be retarded in the following enlargements B—B' to different degrees, so that the more rapidly moving larger particles impinge against the slower moving smaller ones, and thereby engulf them. After almost every enlargement, a deflection of the gas stream accurs which causes separation of the droplets on the walls from the gas stream by centrifugal force and/or impact.

The collected liquid is thereupon forced by the gas stream at the velocity employed into the following restriction and there again is disrupted, so that the process is repeated many times, as even with relatively thin filter layers a great number of consecutive restrictions, enlargements and deflections are provided.

As long as the critical gas velocity is not surpassed to a very high degree, the so-formed coarse particles will be collected in a film on the back side of the filter which runs off and substantially all of the collected liquid runs off from the back side of the filter.

According to a further improvement of the invention, the efficiency of this agglomeration can be further improved by a still further increase of the gas velocity up to such a point that at least a major portion of the formed droplets leaving the last pore in the back face of the filter are no longer collected in the form of a film but are projected therefrom in the form of jets or sprays of coarse droplets. These jets can be easily separated into liquid and gas by known means, for example, by projecting them against a collecting surface, such as, for example, on one or more baffle plates, perforated plates or in cyclones. The effect of the filter is, when operated according to the invention, not that which is commonly understood as a filter effect but essentially an agglomerating or coalescent effect, i.e., the mist containing gas leaves the filter with approximately or even exactly the same liquid content as it has entered the filter but the particle size of the liquid has been increased by passage through the porous material many powers of ten. The collection of the coarse mists which are produced does not present any problem, as problems in mist collection only occur with mist particles smaller than 50µ and especially with particles from 0.01 to 5µ.

The collection of the spray of coarse particles projected from the back face of the porous material, which is approximately of the same character of a spray of a needle shower, does not give rise to any economic or technical problems and in most cases a single baffle plate suffices for the collection of all the liquid. If it is desired to improve the efficiency, which is already higher than that of an electro filter, still further several staggered perforated plates could be used as collecting surfaces or a cyclone could be used.

In the apparatus shown in Fig. 2, the mist containing gas enters the filter apparatus 2 at 1, the filter apparatus containing, for example, a plurality of filter candles 3. As shown, the mist containing gas is passed from the inside of the filter candle tubes to the outside. If desired, in order to increase the efficiency of the process when gasses of low mist content are used, especially during the starting up period, the candles can be sprayed by a spray device 4 to supply additional liquid. Preferably a liquid which has the same composition as droplets of the mist to be collected is used for this purpose, for example, the liquid drawn off at 5. The gas coming out of the filter candles whose mist is substantially coarsened passes through an impact collecting device 6 provided, for example, with a deflecting single baffle plate 7, into the outlet 8. If the gas does not enter the apparatus in the first place with a pressure sufficient to overcome the resistance of the apparatus, means for drawing off the gas, such as a fan 9, can be provided behind outlet 8. The demisted gas leaves the apparatus through outlet 10.

The resistance to flow in the apparatus operated according to the invention is generally substantially higher than normal in the conventional procedures employing porous filters, as within the velocity range employed according to the invention the pressure drop is substantially greater than with the conventional velocities. Usually such gas velocities are used according to the invention so that pressure drops of 100 to 500 mm. water column occur, depending on the character of the filter provided.

Instead of the filter candles, 3, every other known porous material, such as felts, fabrics, or packings of spheres can be used, as long as the surfaces thereof are wettable by the liquid in the mist droplets to be collected and a series of consecutive restrictions and enlargements of the pores in the direction of the gas path is provided. Preferably such filter depths are used that at least ten consecutive restrictions and enlargements are provided.

It is self evident that it is expedient to use a material which is inert to the liquid to be collected. This requirement does not present any difficulty, as practically every solid substance in any form and structure can be used as long as it is porous. Also, the pore size is of secondary importance. However, it has been found expedient to keep the pore size below a certain limit, namely, approximately that in which the diameter of the roughly circular elements of which the filter material is composed does not exceed substantially the capillary height of the filter with respect to the liquid collected. It is also important that the pore diameter should not be smaller than the diameter of the fine mist droplets to be collected, as otherwise the advantages of the process according to the invention would not come into play. The pore sizes which come into consideration are approximately within the range of 20 to 400$\mu$.

For each kind of filter media, an optimal pore diameter exists. This is shown in the following table. A sulphuric acid mist with 85 g. of $H_2SO_4$ (78%)/$m^3$ was passed through a filter layer which consisted of individual spherical silica particles. Layers with different diameters of spheres and therefore different pore-sizes have been used. The depth of the layer was 30 mm. All tests were made at a pressure loss of 200 mm. WC.

| Diameter of spheres, mm. | Corresponding pore size, microns | Permeability, m./sec. | Efficiency, percent |
| --- | --- | --- | --- |
| 1.5 | 140 | 0.7 | 99.09 |
| 2 | 175 | 1.4 | 99.18 |
| 3 | 195 | 2.0 | 98.88 |
| 5 | 230 | 5.0 | 98.41 |

The optimal pore size lies in the instant case in the range of 175 micron.

With higher velocities and corresponding higher pressure drops still better efficiencies were obtained.

The process according to the invention is especially adapted for collecting the liquid contained in mists obtained with the so-called wet-contact process for the production of sulfuric acid in which $SO_2$ gases containing water are passed to the contact chamber so that the mixture of $SO_2$ and water vapor which passes out of the catalyst forms a dense sulfuric acid mist upon cooling. The mists obtained in such wet-contact process are of such a nature that they cannot be washed out completely in scrubbing towers. The resulting refractory mists of relatively small particle size, for example, 0.01 to 1.5 microns in diameter, can however be easily collected by the process according to the invention as can readily be seen from the following:

A misty gas consisting of 94% by volume of nitrogen, 5.8% by volume of oxygen and 0.2% by volume of $SO_2$ containing 12 g./$m^3$ of sulfuric acid mist composed of droplets 0.01 to 1.5 microns in diameter was passed through a porous sintered corundum filter plate 0.5 $m^2$ in area and 8 mm. thick. The porosity of such plate was 26% and the permeability amounted to 3200 $m^3$ air per hour per square meter of filter surface at a pressure loss of 100 mm. water column at 20° C. The velocity of the misty gas passed through the filter plate was varied from comparatively low to very high velocities. The losses in pressure occurring during the passage of the gas through the filter plate and the quantities of mist found in the tail gas are given in the following table:

| gas velocity, $m^3$/h./$m^2$ of filter surface | loss of pressure, mm. water column | mg./$m^3$/ $H_2SO_4$ in the tail gas |
| --- | --- | --- |
| 10 | 25 | 60 |
| 20 | 28 | 300 |
| 50 | 30 | 1,600 |
| 100 | 35 | 2,400 |
| 500 | 43 | 1,500 |
| 1,000 | 50 | 1,300 |
| 2,000 | 85 | 400 |
| 5,000 | 300 | 30 |
| 7,500 | 500 | 12 |

When the loss of pressure relative to the gas velocity is plotted in a logarithmic scale, two sections with different slopes result and a break point occurs in the curve at a velocity of approximately 1050 $m^3$/$m^2$/h. as can be seen from the broken line curve in Fig. 3 of the drawings. At higher velocities, the efficiency of the filter improves very rapidly as also can be seen from the solid line curve of Fig. 3 and the tail gas becomes optically clear at a velocity of 5000 $m^3$/$m^2$/h.

Similar results are obtained with mists other than sulfuric acid mists, such as, for example, phosphoric acid, hydrochloric acid or oil mists. The composition of the carrier gas of the mist is of little consequence in the rate of separation provided a gas velocity is employed which is sufficiently above the break in the pressure-drop-velocity curve. Only the pressure loss is a function of the density of the gas. It increases with higher density or compression of the gases.

The shape of the filter also does not alter the results. For example, when the above filter plate was replaced with filter candles and the gas was passed outwardly therethrough, the same results were obtained.

The process according to the invention is further illustrated by the following examples:

Example 1

A gas at a temperature of 40° C. with a mist content of 110 g./$m^3$, the mist dropletss of which had a droplet diameter of 0.04 to 2$\mu$ and consisted of 80% sulfuric acid was passed through an apparatus similar to that shown in Fig. 2. The porous filter employed however consisted of a layer of glass globules of 2 mm. diameter and 30 mm. high. The critical gas velocity at which the effect according to the invention started to take place was 0.305 m./sec. with reference to the total cross-area of the filter. This velocity corresponds roughly to a velocity of 1.5 m./sec. with reference to the free cross-sectional area of the pores. The pressure drop at this critical velocity was 49.4 mm. water column.

When a velocity of 0.029 m./sec. with reference to the total cross-area of the filter was used, a pressure drop of 20 mm. water column was observed and the efficiency of mist collection was 74%. At a gas velocity of 0.275 m./sec. with reference to the total cross-area of the filter, i.e., just below the critical velocity of 0.305 m./sec. the efficiency of mist collection was 86% and the pressure drop 48.8 mm. water column. In both cases the liquid separated from the gas collected exclusively within the filter apparatus 2.

When the gas velocity was further increased so that the critical velocity of 0.305 m./sec. was substantially surpassed to provide a velocity of 0.56 m./sec., the efficiency of the mist collection was 96%. The pressure drop in this case was 104 mm. water column. At a velocity of 1.38 m./sec., corresponding to a pressure drop of 310 mm. water column, an efficiency of the mist collection of 99.35% was achieved. In the latter case only small amounts of sulfuric acid collected in filter apparatus 2. The main part of the liquid collected was separated from the gas stream within collecting means 6.

*Example 2*

A gas at a temperature of 80° C. with a mist content of 1 g./m.$^3$, the mist droplets of which had a diameter of 0.01 to 1$\mu$ which contained sulfuric acid of 97.5% concentration was treated in an apparatus according to Fig. 2. The filter material consisted of porous candles as shown in Fig. 2. The thickness of the candle walls was 12.5 mm. The candles were formed of fritted granules of alumina having a diameter of 1–2 mm. An exact determination of the pore size was not made, but the porosity of the filter candles was such that an air velocity of 0.7 m./sec. with reference to the total cross-sectional area of the filter could be maintained through the dry filter material with a pressure drop of 100 mm. water column.

The mist was passed through the filter with a velocity of 0.8 m./sec. with reference to the total cross-area of the filter whereby a pressure drop of 200 mm. water column was observed. The gas only after passing the collecting means contained 7.5 mg. $H_2SO_4$/m.$^3$ corresponding to an efficiency of the mist collection of 99.25%. The separated liquid collected almost exclusively within collecting means 6.

*Example 3*

A gas at a temperature of 60° C. with a mist content of 50 g. $H_3PO_4$/m.$^3$, droplet size 0.3 to 3$\mu$ was treated in an apparatus similar to Fig. 2. The filter material which was employed was produced by impregnating carbon pellets of a diameter of 2 mm. with tar and then coking the tar of such impregnated pellets to effect fritting. The depth of the filter material was 10 mm. The baffle plate 7 was replaced in this case by two staggered perforated plates.

At a velocity of 1 m./sec. with reference to the total cross-area of the filter, a pressure drop of 450 mm. water column was observed. The purified gas behind the perforated plates contained 5 mg. $H_3PO_4$/m$^3$. corresponding to an efficiency of 99.99%. The separated liquid collected exclusively within collecting means 6, while no measurable amount of liquid was collected below the filter material in filter apparatus 2.

In the same way, it was possible to separate also organic mists, such as oil mists, completely.

*Example 4*

A sulphuric acid contact chamber was operated with $SO_2$ gas containing water vapor, so that a mixture of $SO_3$ and $H_2O$ vapor was produced which was cooled in a scrubber with sulphuric acid to about 40° C. Heavy mists were produced thereby, which contained 70 grams of $H_2SO_4$ per cubic meter. The mist droplets (having diameters between 0.3 and 3$\mu$) consisted of 75% acid. The cooling tower was followed by a candle filter of acid-resistant ceramic material with a filter element of thickness of 1 cm. and a pore diameter of about 100$\mu$. 500 cubic meters per hour of mist were passed through per square meter of filter surface, thereby separating 99.8% of the mist. The gas was passed to the interior space of the candles, so that the separated acid was forced by means of the gas through the filter surface to the outside, where it dripped off.

The liquid collected at the base of the filter container and was drawn off by means of a siphon. The pressure drop in the filter amounted to about 250 mm. water column. With similar favorable results mists of still more concentrated acid, up to 100% $H_2SO_4$, and also oleum, were able to be separated.

*Example 5*

The hydrogen sulphide from hydrogen sulphide gases produced in a coke plant was converted by combustion into $SO_2$ and water. The mol ratio of $SO_2$ to $H_2O$ was 1:1.5, since the $H_2S$ gas contained water vapor in addition. These moist gases were passed at a temperature of 450° C. to an air cooled five pass vanadium contact chamber, where conversion of $SO_2$ into $SO_3$ occurred, and the gases left the contact chamber at a temperature of 430° C. They were cooled in a cooling tower to 45° C. The cooling tower was sprinkled with sulphuric acid having the concentration of the produced acid. The sulphuric acid was charged into a cooling tower. The cooled dense sulphuric acid mists leaving the cooling tower were thereupon passed to a candle filter which per 1000 cubic meters of gas per hour had 18 filter candles, each of which had an inner diameter of 40 mm., an outer diameter of 60 mm., and a length of 700 mm. The pore diameter amounted to about 120 to 150$\mu$. The characteristics of the filter were such that the critical break point was approximately at a gas velocity of 450 m$^3$./m$^2$./h., whereas the actual velocity employed was 640 m$^3$./m$^2$./h. The filters were hung from a perforated plate and were charged on the inside with the gas, while the acid produced (about 72 kg. of $H_2SO_4$ per 1000 cubic meters of gas passed through) dropped off from the outer surface of the candles in the form of 91.8% acid and collected at the base of the vessel in which the filter candles were accommodated. The pressure loss in the filter amounted to 380 mm. of water and the gases left the filter with a constant of 60 to 80 mg. of $H_2SO_4$ per cubic meter or, in other words, a 99.9% efficiency was obtained.

If it is desired to reduce still further the sulphuric acid content of the waste gases, another filter can be serially disposed in the same arrangement, while water can be sprayed in regulable amounts, in the form of fine droplets, over the candles. This second filter stage can achieve an efficiency of over 95% of the residual mist content, corresponding to a mist content of 3–4 mg./m$^3$., with a pressure loss of, for example, 200 mm., that is, the exhaust gas has a residual content of 3–4 mg. $H_2SO_4$/m$^3$.

As can be seen from the examples, the thickness of the filter material employed according to the invention does not need to be very great, for example, thicknesses between about 5 and 50 mm. are adequate.

The gas velocities employed according to the invention, as previously indicated, must always be above the critical break point in the logarithmically plotted pressure-drop-velocity diagram. However, the finer the mist particles, the greater is the advantage of operating substantially over the break point. If, however, relatively coarse mists are concerned, it is possible to obtain satisfactory results also with gas velocities which are close to but still above the critical break point. When using filters and coarse mists where the break point already occurs at a pressure loss of 50 mm. water column, it is possible to obtain satisfactory mist collections with a pressure loss not very far above this value. Preferably, however, a gas velocity is employed for such coarse mists which causes a pressure drop of at least 100 mm. water column.

This application is a continuation-in-part of application Serial No. 246,378, filed September 13, 1951, now abandoned.

We claim,

1. In a process for collecting the sulfuric acid contained in a sulfuric acid mist containing a substantial quantity of mist particles of a size between 0.01$\mu$ and 3$\mu$, the steps which comprise passing the mist through a wettable porous ceramic filter of bonded granules and having a pore diameter larger than the smallest particles of the mist to be collected at a velocity which is sufficient to cause a pressure drop of between 100 and 500 mm. water column and to cause the liquid to be collected from the mist to pass through the porous filter and which is greater than that corresponding to the break point in the logarithmically plotted pressure-drop-velocity diagram for such porous filter, and collecting the liquid which has passed through the porous filter.

2. In a process for collecting the sulfuric acid contained in a sulfuric acid mist containing a substantial quantity of particles of a size between $0.01\mu$ and $3\mu$, the steps which comprise passing the mist through a wettable porous ceramic filter of bonded granules and having a pore diameter larger than the smallest particles of the mist to be collected at a velocity which is higher than corresponds to the break point in the logarithmically plotted pressure-drop-velocity diagram for such porous filter and which is sufficient to cause a pressure drop of between 100 and 500 mm. water column and to cause at least the major part of the mist to be projected from the back side of the filter in the form of a spray of droplets whose diameter is larger than in the original mist and projecting said spray onto a collecting surface.

3. The process of claim 2 in which the spray projected from the back side of the filter is projected against at least one baffle plate.

References Cited in the file of this patent
UNITED STATES PATENTS

| | | |
|---|---|---|
| 270,763 | Dotterer | Jan. 16, 1883 |
| 848,631 | Cellarius | Apr. 2, 1907 |
| 1,379,056 | Smith | May 24, 1921 |
| 1,544,950 | Smith | July 7, 1925 |
| 2,471,072 | Merriam | May 24, 1949 |
| 2,513,556 | Furczyk | July 4, 1950 |
| 2,745,513 | Massey | May 15, 1956 |
| 2,781,864 | Jahn et al. | Feb. 19, 1957 |